United States Patent Office 3,373,262
Patented Mar. 12, 1968

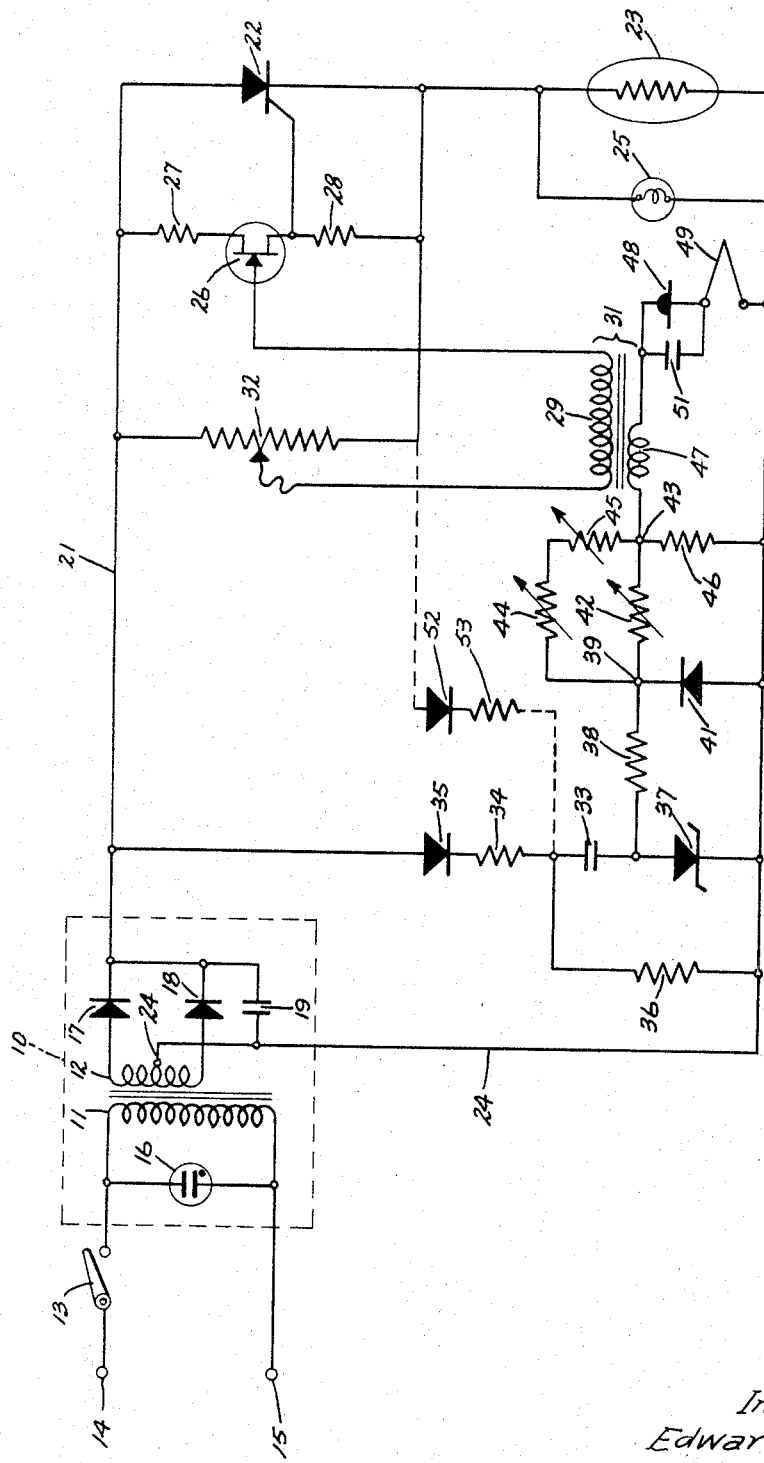

3,373,262
TEMPERATURE CONTROL CIRCUIT
Edward K. Howell, Skaneateles, N.Y., assignor to General Electric Company, a corporation of New York
Filed Aug. 25, 1965, Ser. No. 482,404
5 Claims. (Cl. 219—497)

The present invention relates to temperature sensing and control circuitry and more particularly to solid state circuit means for automatically controlling the temperature of a device or apparatus, such as an electric soldering iron.

Commercial and industrial users of soldering equipment have expressed a need for a soldering device having sufficient versatility to enable it to provide and maintain the proper heat for a wide variety of soldering tasks, ranging from light duty printed and microelectronic circuit applications to such heavy duty applications as the soldering of seams on component covers and cans. Such soldering devices should be capable of providing a relatively wide range of temperatures and also capable of controlling and maintaining any particular selected temperature within such range. The present invention satisfies this need by providing a compact, highly reliable solid state control circuit suitable for automatically controlling and maintaining the tip temperature of a soldering device at a preselected level. The invention senses the tip temperature of the soldering device and controls the application of electrical energy to a heating element therein for maintaining the tip at a preselected heat level.

Accordingly, it is an object of this invention to provide a temperature sensing and control circuit for automatically controlling and maintaining the temperature of a device or apparatus at a preselected level.

Another object is to provide a versatile control circuit for a soldering device for enabling it to provide and maintain a proper temperature for a wide variety of soldering tasks.

A further object of the invention is the provision of a compact, reliable, solid state control circuit to automatically control and maintain the tip temperature of a soldering device at a preselected level to enable it to produce more uniform and reliable solder joints, thereby increasing productivity.

Still another object is to provide a solid state control circuit for automatically controlling and maintaining a soldering device at a preselected heat level thereby eliminating excessive tip temperatures and substantially increasing tip life.

In accordance with one form of my invention, I have provided a solid state control circuit which may be utilized to control the temperature of an electric soldering iron having a temperature sensing element, such as a thermocouple, and a heating element disposed therein. A suitable example of a soldering iron of this type is disclosed in United States Patent 2,897,335 which issued to Thomas E. Finch on July 28, 1959 and which is assigned to the same assignee as the present invention. The novel solid state control circuit utilizes a tunnel diode arrangement for comparing the potential produced by a thermocouple sensing element embedded in the tip of a soldering iron, with a reference voltage proportional to a desired preselected temperature level. When the sensing element indicates that the temperature of the soldering tip is tending to decrease below the preselected level, the tunnel diode arrangement produces a pulse which is induced into the emitter control circuit of a unijunction transistor causing it to trigger a switching means such as a silicon controlled rectifier (SCR), thereby permitting a full wave rectified potential to be applied to a heating element, causing the temperature of the soldering tip to be returned to the preselected level.

Further aspects of my invention will become apparent hereinafter, and the specification concludes with claims particularly pointing out and distinctly claiming the subject matter which I regard as my invention. The invention, however, as to organization and method of operation, together with further objects and advantages thereof, may best be understood by reference to the following description when taken in conjunction with the accompanying figure of drawing in which there is shown a schematic representation of one embodiment of my solid state control circuit.

Referring now to the figure of drawing, there is shown a power supply 10 including a transformer having a primary winding 11 and a center tapped secondary winding 12. Primary winding 11 is coupled via a line switch 13 to input terminals 14 and 15 which, in turn, are to be coupled to a source of alternating current potential. An indicator lamp 16 is coupled across primary winding 11. A pair of diodes 17 and 18 are coupled in a full wave rectifying configuration with center tapped secondary winding 12. A high frequency filter capacitance 19 is coupled between the common cathode coupling point of diodes 17 and 18 and the center tap of winding 12 to remove undesirable high frequency transients.

The common cathode coupling point of diodes 17 and 18 in power supply 10 is coupled via a conductor 21 and an SCR switching means 22 to one terminal of a heating means 23. The other terminal of heating means 23 is coupled via conductor 24 to the center tap of secondary winding 12. An indicator lamp 25 is coupled in parallel with the heater element 23 for indicating its "ON-OFF" condition. A unijunction transistor 26 has a base-two electrode coupled via a resistance 27 to conductor 21 and a base-one electrode coupled to the control or gate electrode of switch means 22 and via a resistance 28 to the common junction of switch means 22 and heating means 23. The emitter electrode of transistor 26 is coupled via a secondary winding 29 of a transformer 31 to the movable contact of a potentiometer 32 which has one of the end terminals of its fixed resistance coupled to conductor 21 and the other coupled to the common junction of switch means 22 and heating means 23.

A storage capacitance 33 has one of its terminals coupled via a resistance 34 and a diode 35 to conductor 21, and via a resistance 36 to conductor 24. The other terminal of capacitance 33 is coupled to one terminal of a Zener diode 37 which has its other terminal coupled to conductor 24. A resistance 38 has one terminal coupled to the common junction of capacitance 33 and diode 37, and the other terminal coupled to a common terminal point 39. A diode 41 has one of its terminals coupled to terminal point 39 and the other terminal coupled to conductor 24. An adjustable resistance 42 is coupled between terminal point 39 and a common terminal point 43. Adjustable resistances 44 and 45 are coupled in series with one another, and in parallel with resistance 42, between terminal points 39 and 43. A resistance 46 is coupled between terminal point 43 and conductor 24. Primary winding 47 of transformer 31 has one end terminal coupled to terminal point 43 and the other end terminal coupled to one terminal of a tunnel diode comparison and control means 48 which has its other terminal coupled to one terminal of a thermocouple temperature sensing means 49. The other terminal of thermocouple 49 is coupled to conductor 24. A filter capacitance 51 is coupled in parallel with tunnel diode 48 for removal of high frequency transients from the tunnel diode.

The following values and types of circuit components are given by way of an example of a circuit that was found to perform satisfactorily in actual operation:

| | |
|---|---|
| Diodes 17 and 18 | A44F |
| SCR switching means 22 | C22F |
| Unijunction transistor 26 | 2N2646 |
| Diodes 35 and 41 | 1N1692 |
| Zener diode 37 | 1N1766 |
| Tunnel diode 48 | 1N3716 |
| Resistance: | |
| 27 | ohms 1000 |
| 28 | do 100 |
| 32 (Potentiometer) | do 940 |
| 34 | do 10 |
| 36 | do 180 |
| 38 | do 100 |
| Adjustable resistance: | |
| 42 | do 50 |
| 44 | do 10 |
| 45 | do 25 |
| Resistance 46 | do 2200 |
| Capacitance: | |
| 19 | microfarad .22 |
| 33 | do 20 |
| 51 | do .03 |
| Heater 23 | 5 ohms, 120 watts |
| Indicator Lamp 25 | 1762 |
| Ratio of winding 11 to winding 12 | 5:2 (center tapped) |
| Transformer 31 | Sprague 93Z20 |
| Alternating current potential source | 120 volts, 60 cycles |

It is to be understood that these various values, and types of circuit components are being given only for purposes of illustration and are not intended to limit the scope of the invention in any way.

With regard to the figure of drawing, the operation of the invention occurs in the following manner. Assuming input terminals 14 and 15 to be coupled to a source of alternating current potential, upon closing power switch 13 an alternating current will flow through primary winding 11, and indicator lamp 16 will conduct. Power supply 10 will then provide, between conductors 21 and 24, a full wave rectified potential comprised of positive half cycles. This potential is coupled across one terminal of heating means 23 by conductor 24, and across the other terminal of heating means 23 by conductor 21 via SCR switching means 22. Thus it becomes apparent that so long as SCR switching means 22 is in its conducting state, this potential will establish a current flow through heating means 23 causing it to supply heat to the tip of the soldering device in which it is embedded, and when SCR switching means 22 is in its nonconducting state, currrent flow through heating means 23 will be prevented and consequently no heat will be provided to the tip of the soldering device. Therefore, it may be seen that by controlling SCR switch means 22, the temperature of the soldering tip may be controlled. Accordingly, the novel solid state control circuitry of this invention controls SCR switching means 22 to provide a preselected temperature at the soldering tip as follows.

Temperatures sensing thermocouple 49, which is embedded in the tip of the soldering device, continuously produces a potential which is directly proportional to the temperature of the tip. This potential is applied to one terminal of tunnel diode 48, with a polarity opposite to that of an adjustably controlled reference potential which is applied to the other terminal of diode 48. This adjustably controlled reference potential is established in the following manner. The positive half cycles of supply potential from power source 10 are coupled via diode 35 and resistance 34 to charge storage capacitance 33. Capacitance 33 is charged during the increasing portion of each positive half cycle of supply potential, and discharges during the portion when the supply potential falls below the level to which it is charged, particularly when a half cycle of supply potential is approaching and passing through zero. This discharge by capacitance 33 through resistance 36 and Zener diode 37 causes a fixed or constant Zener potential to appear across diode 37, having a polarity positive at its cathode and negative at its anode. This constant Zener potential, present during the discharge of capacitance 33, is applied via resistance 38 across diode 41 causing it to become forward biased and to conduct during the discharge of capacitance 33. The forward voltage drop of diode 41 provides additional regulation of this constant Zener potential, and the temperature characteristics of diode 41 compensate for the temperature characteristics of tunel diode 48 thereby providing increased stability for the circuit in the presence of variations in the ambient temperature. This constant Zener potential is applied through a voltage dividing network including adjustable resistances 42, 44, and 45, and fixed resistance 46, and the primary winding 47 of transformer 31 to tunnel diode 48. Resistances 42 and 45 determine the lower and upper limits, respectively, of the range of desired tip temperatures, and resistance 44, which may be calibrated in degrees after initially setting resistances 42 and 45 for a desired range, determines the particular operating temperature within that range. Thus a control potential is established across tunnel diode 48 whose value is determined by the algebraic sum of the potential produced by thermocouple sensing means 49 and the adjustable reference potential produced during each discharge of storage capacitance 33. The value of this control potential will cause diode 48 to operate in one of two impedance states.

When the temperature of the soldering tip as sensed by thermocouple sensing means 49 increases, the control potential developed across diode 48 is reduced, whereas a decrease in the tip temperature causes this control potential to increase. When the tip temperature decreases sufficiently to cause this control potential to exceed the peak point of tunnel diode 48, the diode will switch to a higher impedance state causing a pulse to be developed across primary winding 47 of transformer 31, thereby inducing a voltage in secondary winding 29. Winding 29 is polarized in such manner that this induced voltage adds to the bias potential established by potentiometer 32, and the resulting combined potential is sufficient to trigger unijunction transistor 26 into conduction, thereby producing a current into the gate electrode of SCR switching means 22 causing it to conduct and permit current to flow through heating means 23 to increase the temperature of the soldering tip.

As soon as the pulse of voltage induced in secondary winding 29 as a result of tunnel diode 48 changing impedance levels disappears, the emitter voltage of unijunction transistor 26 will be reduced to the level of the bias potential, which is maintained by potentiometer 32 at a value less than the emitter peak point voltage necessary to cause transistor 26 to conduct. Thus transistor 26 will cease conduction, thereby stopping the flow of gate current to SCR switching means 22, causing it to cease conduction as the current flow therethrough drops to zero at the end of the half cycle of supply potential. When SCR switching means 22 ceases conduction, heating means 23 and indicating lamp 25 are turned off.

The reference potential applied to tunnel diode 48 is present only during the discharge of storage capacitance 33, and since this reference potential must be present for diode 48 to change to its high impedance state thereby pulsing transistor 26 into conduction and triggering SCR 22 to conduct, it may be seen that SCR 22 can be triggered "ON" only while capacitance 33 is discharging, which occurs as each half cycle of rectified supply potential approaches and passes through zero. Also SCR 22 will cease to conduct at the end of a half cycle of supply potential as the current flow drops to zero. Thus SCR 22 is switched on and off respectively at points of minimum supply potential, i.e., the beginning and/or ending of a half cycle. Limiting this ON-OFF switching action to points of minimum supply potential reduces radio frequency interference (RFI) produced by the switching action to a minimum while providing very high gain and fast response time.

So long as the tip temperature of the soldering means is less than the desired temperature corresponding to the particular setting of adjustable resistance 44, the control potential applied across tunnel diode 48 will cause diode 48 to switch to its high impedance level during each discharge of capacitance 33. This switching of diode 48 produces a control pulse in secondary winding 29 to cause transistor 26 to conduct and retrigger SCR 22 at the beginning of each half cycle of supply potential thereby effectively maintaining SCR 22 in a state of conduction and causing heating means 23 to increase the temperature of the soldering tip. When the temperature of the soldering tip has been increased to the desired level, thermocouple 49 will cause the control potential across tunnel diode 48 to drop below the diode peak point and diode 48 will remain in its low impedance state. Thus, further control pulses will cease to be produced in primary winding 47, causing transistor 26 to remain nonconducting and SCR 22 to cease conduction as the half cycle of supply potential following the most recent trigger pulse passes to zero. Heating means 23 will then cease to supply heat until thermocouple 49 senses that the tip temperature is beginning to drop below the desired preselected level. At that time tunnel diode 48 will be switched to its high impedance state during the next and successive discharges of capacitance 33, causing transistor 26 to again trigger SCR 22 into conduction during each succeeding half cycle of supply potential until heating means 23 returns the soldering tip to the desired temperature.

If it should be found desirable in a particular application to cause the ON and OFF switching points of the circuit to occur at slightly different temperatures, a diode 52 and a resistance 53 (shown coupled by broken conductor in the figure of drawing) may be coupled between the cathode electrode of SCR switching means 22 and the junction of storage capacitance 33 and resistance 34. This will cause the voltage on capacitance 33 to be increased whenever SCR 22 is conducting and heating means 23 is energized, thereby producing the desired ON-OFF differential or hysteresis action. Also, if it is desired for a particular application to have a visual indication of the actual temperature of the device being controlled, the potential produced by thermocouple 49, or by an independent thermocouple, may be applied to a microvoltmeter calibrated in degrees.

Thus, it becomes apparent from the foregoing description and annexed drawing that the disclosed invention, a completely solid state control circuit for automatically sensing and maintaining the temperature of an element or apparatus at an adjustable, preselected level, is a useful and practical device having many applicatiois in the field of automatic temperature control in addition to the specific application described herein.

Although the present invention has been described by reference to a preferred embodiment thereof, it is to be understood that many modifications may be made by those skilled in the art without actually departing from the invention. It is therefore intended by the appended claims to cover all such modifications that fall within the true spirit and scope of the invention.

What I claim as new and desire to secure by Letters Patent of the United States is:

1. A temperature sensing and control circuit for automatically controlling and maintaining the temperature of a device at an adjustable, preselected level, said temperature sensing and control circuit comprising: a source of potential; a heating means for supplying heat to a device whose temperature is to be controlled and maintained; an electrical switch means coupling said heating means to said source of potential for selectively applying said potential to said heating means to cause it to apply heat to said device in response to control signals; a temperature sensing means for continuously providing a first control potential proportional to the actual temperature of said device; an adjustable source of reference potential for providing a second control potential proportional to a preselected desired temperature level at which said device is to be maintained; and an electrical comparison and control means coupled to said temperature sensing means and to said adjustable source of reference potential for receiving and comparing said first and second control potentials and producing control signals in response thereto, said electrical comparison and control means including a tunnel diode coupled to a unijunction transistor and said electrical switching means comprising a controlled rectifier triggered by a unijunction transistor which is coupled to said electrical comparison and control means for causing said source of potential to be selectively applied to said heating means in accordance with said control signals to maintain said device at said preselected desired temperature level.

2. A temperature sensing and control circuit for automatically controlling and maintaining the temperature of a device at an adjustable, preselected level, said sensing and control circuit comprising: a source of potential; a heating means for supplying heat to a device whose temperature is to be controlled and maintained; an electrical switching means coupling said heating means to said source of potential for selectively applying said potential to said heating means to cause it to apply heat to said device in response to control signals; a temperature sensing means for continuously providing a first control potential proportional to the actual temperature of said device, said temperature sensing means including a thermocouple; an adjustable source of reference potential for providing a second control potential proportional to a preselected desired temperature level at which said device is to be maintained, said adjustable source of reference potential comprising an adjustable resistance means and a storage capacitor charged from said source of potential and discharged through a plurality of diode means to produce a constant reference potential; and an electrical comparison and control means coupled to said temperature sensing means and to said adjustable source of reference potential for receiving and comparing said first and second control potentials and producing control signals in response thereto, said electrical comparison and control means comprising a tunnel diode coupled to a unijunction transistor, said adjustable resistance means coupled between said plurality of diode means and said tunnel diode to set said constant reference potential to a potential directly proportional to said preselected desired temperature level at which said device is to be maintained, and said electrical switching means comprising a controlled rectifier triggered by a unijunction transistor which is coupled to said electrical comparison and control means for causing said source of potential to be selectively applied to said heating means in accordance with said control signals to maintain said device at said preselected desired temperature level.

3. A temperature sensing and control circuit for automatically controlling and maintaining the tip temperature of a soldering device at an adjustable preselected level, said temperature sensing and control circuit comprising: a source of potential; a heating means disposed in thermal contact with the tip of a soldering device; an electrical switching means coupling said heating means to said source of potential for selectively applying said potential to said heating means causing it to apply heat to said tip of said soldering device in response to control signals; a temperature sensing means disposed in thermal contact with said tip of said soldering device for continuously providing a first control potential proportional to the actual temperature of said tip; an adjustable source of reference potential for providing a second control potential proportional to a preselected desired temperature level at which said tip is to be maintained; and an electrical comparison and control means coupled to said temperature sensing means and to said adjustable source of reference potential for receiving and comparing said first and second control potentials and producing control signals in response thereto, said electrical comparison and control means comprising a tunnel diode coupled to a unijunction transistor, and said electrical switching means comprising a controlled rectifier coupled to and triggered by said unijunction transistor which has its emitter electrode directly coupled to an adjustable source of bias potential and is coupled to said electrical comparison and control means for receiving said control signals for causing said source of potential to be selectively applied to said heating means in accordance with said control signals to maintain said tip of said soldering device at said preselected desired temperature level.

4. A temperature sensing and control circuit for automatically controlling and maintaining the tip temperature of a soldering device at an adjustable preselected level, said temperature sensing and control circuit comprising: a source of potential; a heating means disposed in thermal contact with the tip of a soldering device; an electrical switching means coupling said heating means to said source of potential for selectively applying said potential to said heating means causing it to apply heat to said tip of said soldering device in response to control signals; a temperature sensing means disposed in thermal contact with said tip of said soldering device for continuously providing a first control potential proportional to the actual temperature of said tip, said temperature sensing means including a thermocouple and said adjustable source of reference potential including an adjustable resistance means and a storage capacitor charged from said source of potential and discharged through a plurality of diode means to produce a constant reference potential; an adjustable source of reference potential for providing a second control potential proportional to a preselected desired temperature level at which said tip is to be maintained; and an electrical comparison and control means coupled to said temperature sensing means and to said adjustable source of reference potential for receiving and comparing said first and second control potentials and producing control signals in response thereto, said electrical comparison and control means including a tunnel diode coupled to said unijunction transistor, said adjustable resistance means coupled between said plurality of diode means and said tunnel diode to cause said reference potential to become directly proportional to said preselected desired temperature level at which said tip is to be maintained, said electrical switching means including a controlled rectifier coupled to and triggered by a unijunction transistor which has its emitter electrode coupled to an adjustable source of bias potential, and is coupled to said electrical comparison and control means for receiving said control signals for causing said source of potential to be selectively applied to said heating means in accordance with said control signals to maintain said tip of said soldering device at said preselected desired temperature level.

5. A solid state temperature sensing and control circuit for automatically controlling and maintaining the tip temperature of a soldering device at an adjustable preselected level, said temperature sensing and control circuit comprising: a source of full wave rectified alternating current potential; a heating means disposed in thermal contact with the tip of a soldering device; a silicon controlled rectifier coupling said heating means to said source of full wave rectified alternating current potential for selectively applying said potential to said heating means in response to trigger signals applied to the control electrode of said rectifier for causing said heating means to apply heat to said tip of said soldering device; a thermocouple temperature sensing means disposed in thermal contact with said tip of said soldering device for continuously providing a first control potential proportional to the actual temperature of said tip; an adjustable source of reference potential for providing a second control potential proportional to a preselected desired temperature level at which said tip is to be maintained, said source of reference potential including a storage capacitance charged from said source of full wave rectified alternating current potential and discharged through diode means and adjustable resistance means; a tunnel diode electrical comparison and control means coupled to said thermocouple temperature sensing means and to said adjustable source of reference potential for receiving and comparing said first and second control potentials and producing control signals in response thereto; and a unijunction transistor means having its emitter electrode directly coupled to a source of adjustable bias potential and inductively coupled to said tunnel diode electrical comparison and control means for receiving said control signals therefrom, and having one of its base electrodes coupled to the control electrode of said silicon controlled rectifier for providing said trigger signals thereto to cause said source of full wave rectified alternating current potential to be selectively applied to said heating means in accordance with said control signals to maintain said tip of said soldering device at said preselected desired temperature level.

References Cited
UNITED STATES PATENTS

| | | | |
|---|---|---|---|
| 2,897,335 | 7/1959 | Finch | 219—237 |
| 3,149,224 | 9/1964 | Horne et al. | 219—497 |
| 3,173,078 | 3/1965 | Farnsworth. | |
| 3,204,174 | 8/1965 | Clerc. | |
| 3,280,306 | 10/1966 | Chubb | 219—497 X |
| 3,300,622 | 1/1967 | Swain | 219—497 |
| 3,329,887 | 7/1967 | Schaeve | 219—497 X |

RICHARD M. WOOD, *Primary Examiner.*

L. H. BENDER, *Assistant Examiner.*